(12) United States Patent
Van Halteren

(10) Patent No.: US 7,822,218 B2
(45) Date of Patent: Oct. 26, 2010

(54) ELECTROACOUSTIC TRANSDUCER MOUNTING IN SHELLS OF HEARING PROSTHESES

(75) Inventor: Aart Zeger Van Halteren, EG Hobrede (NL)

(73) Assignee: Sonion Nederland B.V. (NL)

( * ) Notice: Subject to any disclaimer, the term of this patent is extended or adjusted under 35 U.S.C. 154(b) by 1284 days.

(21) Appl. No.: 11/328,569

(22) Filed: Jan. 10, 2006

(65) Prior Publication Data
US 2006/0153418 A1    Jul. 13, 2006

Related U.S. Application Data

(60) Provisional application No. 60/642,641, filed on Jan. 10, 2005.

(51) Int. Cl.
*H04R 25/00* (2006.01)
(52) U.S. Cl. .................. 381/324; 381/312; 381/322
(58) Field of Classification Search ............ 381/324
See application file for complete search history.

(56) References Cited

U.S. PATENT DOCUMENTS

| 3,048,920 | A |   | 8/1962 | Wheeler |
| 4,109,116 | A |   | 8/1978 | Victoreen |
| 4,553,627 | A | * | 11/1985 | Gastmeier et al. ........ 181/135 |
| 6,549,634 | B1 | * | 4/2003 | Vonlanthen ............ 381/322 |
| 6,813,364 | B1 |   | 11/2004 | Vonlanthen ............ 381/322 |
| 6,891,956 | B2 |   | 5/2005 | Heerlein et al. |
| 2003/0048920 | A1 | * | 3/2003 | Van Halteren et al. ...... 381/424 |

FOREIGN PATENT DOCUMENTS

| DE | 3502178 | 1/1985 |
| EP | 1 257 147 A2 | 11/2002 |
| WO | WO2004/049756 A1 | 6/2004 |
| WO | WO2004/103018 A2 | 11/2004 |
| WO | WO2004/103018 A3 | 11/2004 |

OTHER PUBLICATIONS

Standard Search Report for European Patent Office dated Dec. 22, 2005 (3 pages).
European Search Report for Application No. EP 06 00 0287, dated Jun. 22, 2006 (13 pages).

* cited by examiner

*Primary Examiner*—Curtis Kuntz
*Assistant Examiner*—Matthew Eason
(74) *Attorney, Agent, or Firm*—Nixon Peabody LLP

(57) ABSTRACT

A hearing aid and a receiver for use therein, the receiver being tip-mountable in a chamber of a housing. The back chamber of the receiver is acoustically connected to the chamber of the housing. The receiver is a dual-diaphragm receiver providing no or very little vibrations, whereby the receiver is fixedly but removably mounted to the housing. Electrical connections are provided between the receiver and housing using solderless, biasing electrical contacts, whereby removal of the receiver is facilitated.

11 Claims, 3 Drawing Sheets

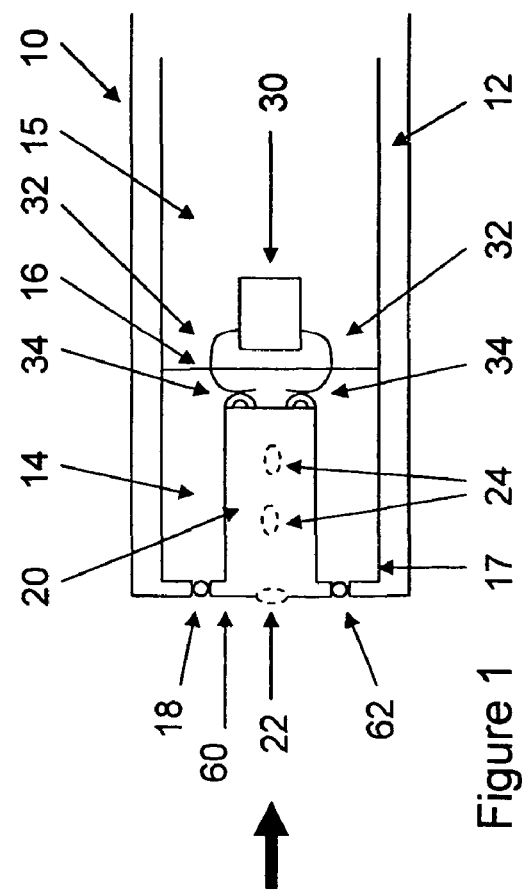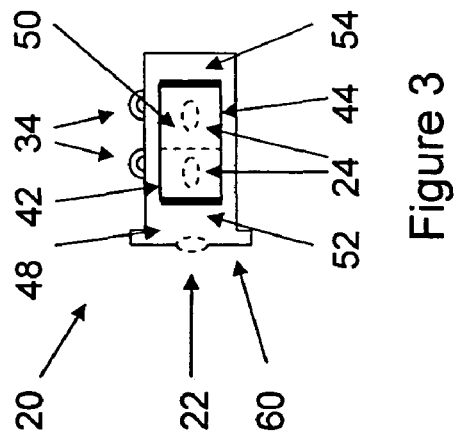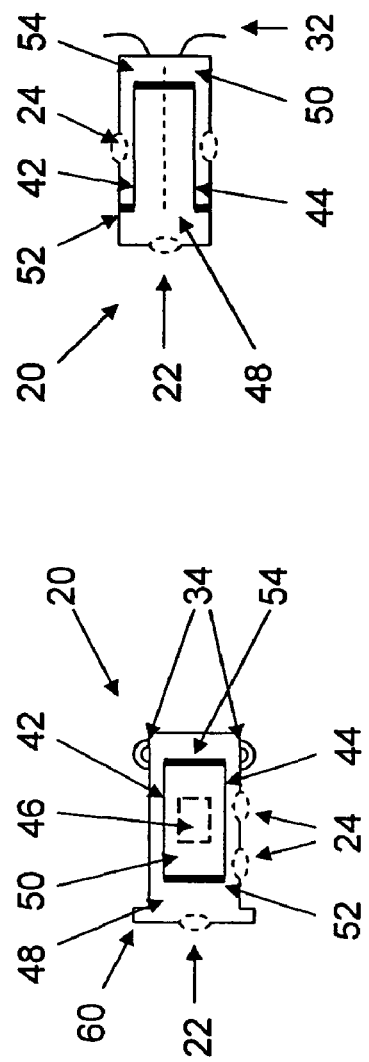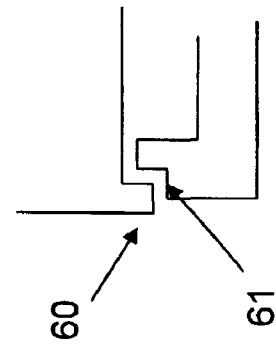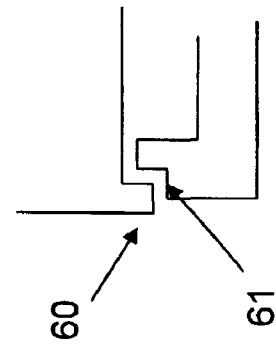

ELECTROACOUSTIC TRANSDUCER MOUNTING IN SHELLS OF HEARING PROSTHESES

This application claims the benefit of U.S. Provisional Application No. 60/642,641, filed Jan. 10, 2005.

FIELD OF INVENTION

The present invention relates to improvements in personal communication devices, such as hearing aids or in-ear monitors, and especially in miniature hearing aids or in-ear monitors, such as ITE/CIC/ITC hearing aids or monitors, which require extremely small components and which need to be adapted to the dimensions of the ear canal of the user.

BACKGROUND OF THE INVENTION

Hearing aid receivers or loudspeakers have conventionally been mounted in both BTE (behind the ear) and ITE (in the ear) hearing aids with the use of resilient suspensions to suppress or attenuate mechanical vibrations of the receivers and prevent that these were transmitted to a microphone of the hearing aid. Due to the requirements of very large acoustical gain between proximately located microphone and receiver components, the utilization of the resilient suspension has been required to avoid feedback oscillation caused by coupling of mechanical vibrations between the receiver and microphone.

Conventional or prior art resilient suspensions include elastomeric rubber boots and elastomeric strips or ribbons mounted to partly or fully encircle the receiver housing and optionally were provided with shock absorbing protrusions and several other types of resilient supports. Through careful design of the resilient properties of these prior art resilient suspensions these have been adapted to attenuate or decouple mechanical vibrations of the receiver so as to prevent these from being coupled to the housings of the BTE and ITE hearing aids.

Furthermore, electrical signals from a hearing aid amplifier to the receiver have conventionally been provided through, for example, a pair of flexible electrical leads such as multi-core litze wires soldered to respective terminals of the receiver.

These prior art hearing aid constructions incurred a number of technical problems that are overcome by the present inventions.

One problem associated with the above-mentioned hearing aid construction techniques is the space requirement inside the hearing aid shell to accommodate the resilient suspension and flexible leads. In small hearing aids such as the ITE type of hearing aids and in particular in ITC (in the canal) and CIC (completely in-the-canal) type of hearing aids, the available space for the resilient suspension at a tip of the hearing aid shell is typically very limited since the shell tip must be dimensioned for placement deeply inside the ear canal of the user or patient. Another problem is that even if adequate space for the resilient suspension is available at the tip of the hearing aid shell, the correct placement of the resilient suspension can be very difficult and therefore time consuming for the assembly technician because it must be ensured that the resiliently suspended receiver is allowed substantially unrestricted vibration does not contact the walls of the hearing aid shell. Finally, the correct placement of the resiliently suspended receiver is subjected to additional difficulties by the presence of the pair of flexible electrical leads which tends to pull or push the receiver away from the correct position due to the stiffness of the leads and the low weight and resilient suspension of the receiver.

These problems are firstly encountered during manufacture of the hearing aid but, unfortunately, resurface if the hearing aid receiver malfunctions or fails in the field and needs replacement in a service and repair shop. This is, unfortunately, a very common situation because the receiver is placed at a very exposed position deeply inside in the user's ear canal where it is subjected to moisture and cerumen contamination. In this latter repair situation, it may be an even more difficult task for the service technician to ensure correct positioning of the replacement receiver inside its resilient suspension and the shell part(s) because he may lack adequate instructions, measurement equipment or training to complete the task. Furthermore, in prior art ITE hearing aids, the receiver has only been replaceable from a rear portion or so-called faceplate portion of the aid where a substantially plane pre-manufactured plastic plate has been glued to the upper circumferential portion of the hearing aid shell so as to isolate the interior of the hearing aid from the surrounding environment. Accordingly, to replace the defective receiver, the faceplate portion of the aid had to be re-opened with a substantial risk of damaging the customized ITE shell and/or mechanical or electronic components housed within the shell.

U.S. Pat. No. 4,109,116 discloses a miniature dual-diaphragm moving armature receiver for hearing aid applications. The dual-diaphragm receiver is formed as a back-to-back mounted assembly of a pair of conventional single diaphragm moving armature receiver to achieve cancellation of mechanical vibrations of the receiver. The dual-diaphragm receiver is mounted inside an earphone and the earphone may be inserted into and acoustically coupled to an earmold that is insertable in the ear canal of a hearing aid user. The disclosed dual-diaphragm moving armature receiver does not comprise a common front chamber or a common back chamber but has separate chambers coupled exclusively to each single diaphragm receiver.

WO 2004/049756 discloses a single diaphragm moving armature receiver that comprises a motion reversing arrangement or linkage assembly coupled between a diaphragm and the moving armature. If the effective moving masses of the armature assembly and the diaphragm assembly are made identical, some cancellation of mechanical vibrations of the receiver can be achieved.

US 2003/0048920 describes a receiver having two sound outputs for different frequency intervals. These outputs are derived from the front and back chamber, respectively, of the receiver and output from different outputs of a housing.

SUMMARY OF THE INVENTION

The invention relates to a number of solutions to the aforementioned problems. In a first aspect, the invention relates to a personal communication device, such as but not limited to an in-ear monitor or a hearing aid, comprising a housing and a miniature loudspeaker, such as a receiver, which may be a moving coil transducer or a moving armature transducer, wherein the housing comprises an inner space having a first compartment and a second compartment acoustically sealed from the first compartment wherein the first compartment comprises a sound outlet port toward the surroundings of the housing. In this aspect, the miniature loudspeaker is releasably mounted in the first compartment so that the sound outlet port is substantially sealed around a predetermined portion of the miniature loudspeaker. In accord with this aspect, the miniature loudspeaker comprises a sound outlet acoustically coupled to the sound outlet port of the first compartment, a diaphragm positioned in the miniature loudspeaker for producing the sound, the diaphragm comprising first and second opposing surfaces, a first acoustic path (e.g., an opening, tunnel, channel, space, etc.) between the first surface and the sound outlet, and a second acoustic path between the second surface of the diaphragm and the first compartment of the housing.

Thus, an assembly has been invented in which the acoustic path, normally denoted the front chamber, between the sound outlet and the diaphragm or membrane may be a standard front chamber, but in which the back chamber, which is the normal phrase for the acoustic chamber or path connected to the other side of the diaphragm, now also includes at least part of the compartment in which the miniature loudspeaker is positioned. Thus, the miniature loudspeaker has more than one sound path from its interior to the exterior thereof, one path comprising the sound outlet and one or more others connecting (acoustically) the interior of the miniature loudspeaker with the interior of the housing. This provides a number of degrees of freedom in that the volume and acoustic properties of the back chamber may be varied within wider limits than what was possible within the dimensions normally available in miniature loudspeakers.

In the present context, the sound outlet port of the housing may be an open port or an opening sealed with, for example, a membrane or other seal in order to prevent dirt or other foreign matter from entering the hearing aid and miniature loudspeaker.

The sound outlet port is provided in the housing and is sealed around the miniature loudspeaker having the sound outlet. Consequently, sound exits the housing and the miniature loudspeaker from the sound outlet positioned in or at the sound outlet port. The sealing of the sound outlet port is performed in order to ensure a sealing of the first compartment which forms part of the back chamber. The coupling between the sound outlet and the sound outlet port may be an open channel or may be via a sealing membrane if such sealing, such as for dirt or other foreign matter, is desired.

In this connection, "substantially sealed" is to be interpreted with the acoustic properties in mind. Thus, a small gas passage may be allowed in order to provide a DC passage of gas for pressure equalization when the atmospheric pressure of the surroundings of the hearing aid changes. Then, a biasing of the diaphragm would exist, if an equalization of the back chamber was not performed. This DC gas passage, however, is so small that it does not affect the acoustic properties of the chamber to any significant degree at audible frequencies.

The same interpretation is made of the "acoustic path" and the "acoustic coupling", which again are at audible frequencies. The path and coupling may be provided, for example, by an open channel or by a membrane, if desired. Again, the path and coupling may be adapted to provide predetermined acoustic properties—normally in the audible area.

In this context, a "miniature loudspeaker" or "miniature transducer" will be a loudspeaker/transducer having extend, in the plane of the diaphragm, over an area of less than about 4.0 mm$^2$ (e.g., 4.0×4.0 mm), 3.5 mm$^2$ (e.g., 3.5×3.5 mm), or even more preferably less than about 3.0 mm$^2$ (e.g., 3.0×3.0 mm). Alternatively or additionally, a miniature loudspeaker/transducer comprises a MEMS-based (Micro-Electro-Mechanical-System) transducer element which is a transducer element wholly or at least partly fabricated by application of Micro Mechanical System Technology. The miniature loudspeaker element may comprise a semiconductor material, such as Silicon or Gallium Arsenide, in combination with conductive and/or isolating materials, such as silicon nitride, polycrystalline silicon, silicon oxide and glass. Alternatively, the miniature transducer element may comprise conductive materials, such as aluminium, copper, etcetera, optionally in combination with one or more isolating materials, such as glass and/or silicon oxide.

In the present aspect, the miniature loudspeaker is provided in the first chamber, which is substantially sealed and which is acoustically separated from the other chamber. The other chamber may comprise a sound receiver, whereby the acoustic separation is to prevent feedback from the miniature loudspeaker and the sound receiver. The other chamber may additionally or alternatively comprise electronics adapted to feed an electric signal to the miniature loudspeaker for providing the sound.

It should be mentioned that, even though it is not preferred in this embodiment, the first chamber may be, alternatively to the connection to the back chamber, acoustically connected to the front chamber. Then, the miniature loudspeaker will have multiple sound outputs from the front chamber, one output being in the predetermined area and another at another position allowing sound to enter the first chamber.

It should be noted that, in general, the miniature loudspeaker need not be fully enclosed in the first chamber. A part of the miniature loudspeaker may extend out of the sound outlet port of the housing.

In a particularly preferred embodiment, the miniature loudspeaker comprises a pair of diaphragms, the first sides of which are oppositely directed. This set-up normally is called a dual-diaphragm miniature loudspeaker. This opposite direction means that in order for both diaphragms to provide a pressure pulse in the front chamber (to feed toward the sound outlet), the two diaphragms must move in opposite directions. This has the advantage of reducing or removing vibration of the miniature loudspeaker and housing during sound generation. This provides a number of advantages both in the manner in which the miniature loudspeaker may be mounted in the housing and how it may be engaged for electrical contact.

In one situation, in at least the above-noted embodiment, the housing and miniature loudspeaker are hard mounted to each other without resilient suspension, such as by mounting the miniature loudspeaker directly to the housing using glue, welding, soldering, or the like.

The dual-diaphragm miniature loudspeaker is then preferably mounted directly to the communication device shell/housing inside the closed chamber without using a resilient suspension. In one embodiment of the invention, the air volume confined inside the acoustic first chamber is interconnected to the back chamber of the dual-diaphragm miniature loudspeaker while a common front volume of the miniature loudspeaker is connected to the sound outlet port of the acoustic chamber so as to convey sound to the user's ear canal. This embodiment of the invention provides the dual-diaphragm miniature loudspeaker with a very large effective back volume or chamber which in turn has several beneficial effects such as increasing the maximum output sound pressure capability, increasing the efficiency and raising the sensitivity of the dual-diaphragm miniature loudspeaker. Furthermore, since the dual-diaphragm miniature loudspeaker may be attached directly to the communication device shell and electrically connected through the use of engaging/abutting/biasing (see below) contacts inside the acoustic chamber, a significant size of the internal volume in the acoustic chamber can be obtained inside a shell of a small ITE/ITC/CIC type of communication device.

In another embodiment, the first compartment and the miniature loudspeaker comprise mating first and second electrically conducting contact means adapted to provide solderless/solderfree, electrical conduction between the contact means of the first compartment and the miniature loudspeaker. Such conduction may be provided by abutting the electrically conducting means, preferably using a physical biasing in order to ensure contact during thermal changes, vibrations, etcetera. Alternatively, a more fixed engagement (using a thread or other mechanically engaging parts) may be used. Preferably, the engagement is detachable in a non-destructive manner.

This embodiment is especially interesting when combined with the above dual-diaphragm embodiment in that providing this type of abutment/engagement/biasing, which has a tendency of providing acoustic coupling between the abutting elements, is less desirable, if the miniature loudspeaker produces large quantities of undesired vibrations.

In the present embodiment, at least one of the first and second electrically conducting contact means may be adapted to provide a resilient, electrically conducting contact means. In order to provide the above-mentioned biasing, this resilient electrically conducting contact means could comprise an electrically conducting spring, such as a helical, torsion, or leaf spring. Alternatively, the resilient electrically conducting contact means could comprise, but is not limited to, for example, electrically conducting foam (such as polymeric foam with a surface covering of an electrically conducting material), a web (of an electrically conducting material), or other resilient material (e.g., rubber) or composite bearing conductive stringers, threads, or the like.

In this embodiment, the electrically conducting contact means of the first compartment are preferably provided on a surface opposite to the sound outlet port, and the electrically conducting contact means of the miniature loudspeaker are provided on an outer surface thereof opposite to the first area or part. In this manner, engagement is obtained forcing or biasing the miniature loudspeaker into the first chamber in a direction away from the outlet port. Naturally, however, these electrically conducting elements may be provided in other positions, whereby the biasing is then obtained along other directions.

Another interesting embodiment is one wherein the housing and the miniature loudspeaker comprise means for releasably fixing the miniature loudspeaker in a predetermined position in the first compartment, the fixing means being adapted to be operable by engaging the housing and/or miniature loudspeaker from outside the housing and/or miniature loudspeaker. This operation from outside the housing also facilitates attachment and detachment. This may be an operation providing a pressure force to one or both elements, providing a rotation or the like. This operation may be purely manual or may require the use of tools. Also, operation only from outside the housing provides maintenance, assembly and the like not requiring opening the housing at other positions. The housing, thus, may be manufactured as a single, monolithic part.

This releasable fixing will facilitate both initial assembly as well as disassembly for repair and maintenance.

These fixing means may be any releasable fixing means, preferably means providing non-destructive attachment and detachment, such as one or more of a snap lock, a thread, a bayonet coupling, a key way, and snap taps.

In a preferred embodiment, the sound outlet port has a predetermined inner contour in a predetermined plane, and the miniature loudspeaker has an outer contour, in a plane perpendicular to an axis of the miniature loudspeaker through the miniature loudspeaker and the sound outlet thereof, and over a majority of its length from a position farthest from the inlet/outlet and toward the outlet, which outer contour may be circumscribed by the inner contour of the sound outlet port. In at least some aspects, the outer contour of a first portion of the miniature loudspeaker has an outer dimension (e.g., a circumference) greater than a corresponding dimension in a second portion of the miniature loudspeaker, the second portion comprising a majority of an axial length of said miniature loudspeaker.

Normally, this plane would be perpendicular to a direction in which the miniature loudspeaker, or at least part thereof, is introduced into the housing. This, however, is not a requirement.

In this manner, at least the major part of the miniature loudspeaker may be moved into the first chamber via the sound outlet port, starting with the part the farthest from the sound outlet. If the full length of the miniature loudspeaker has an outer contour allowing insertion through the sound outlet port, the full miniature loudspeaker may be received in the first chamber. Otherwise, a part of the miniature loudspeaker at the sound port may extend out of the sound outlet port while the remaining part is received in the first chamber. This introduction in and, when combined with the embodiment facilitating releasable fixing of the miniature loudspeaker in the first chamber, removal of the miniature loudspeaker from the outlet side facilitates assembly and disassembly and especially when combined with the embodiment avoiding soldering in the electrical contacting between the miniature loudspeaker and the first chamber.

In a second aspect, the invention relates to a miniature loudspeaker, such as z receiver, for use in a personal communication device, such as a hearing aid, the miniature loudspeaker comprises a sound outlet positioned in a first predetermined portion and being adapted to transport sound from an inner chamber of the miniature loudspeaker and through the sound outlet and toward the surroundings of the miniature loudspeaker and one or more diaphragms positioned in the miniature loudspeaker for producing the sound, each diaphragm having a first side and a second, opposite side, an acoustic path existing between the first side(s) and the sound outlet. The miniature loudspeaker further comprises an acoustic path between the second side(s) of the diaphragm(s) and the surroundings of the miniature loudspeaker, the acoustic path being provided in a second portion different from the first predetermined portion and means for releasably fixing the miniature loudspeaker to a housing, the fixing means being operable by engaging the housing and/or the miniature loudspeaker from outside the housing and/or miniature loudspeaker.

Thus, a miniature loudspeaker is provided having sound paths in different parts thereof and means for releasable fixing thereof in a housing. Thus, the advantages mentioned above are obtained.

In one embodiment, the miniature loudspeaker comprises at least two diaphragms, the first sides of which are oppositely directed in order to obtain less or no vibrations from the sound generation.

In addition or alternatively, the fixing means could comprise one or more of a snap lock, a thread, a bayonet coupling, a key way, and snap taps.

Also, the miniature loudspeaker preferably further comprises electrically conducting contact means adapted to provide solderless/solderfree electrical conduction to the contact means of a first compartment of a housing. These electrically conducting contact means could be adapted to provide a resilient electrically conducting contact means and may comprise an electrically conducting spring, such as a helical, torsion, or leaf spring, or electrically conducting foam, web, or the like.

Preferably, the electrically conducting contact means of the miniature loudspeaker are provided on an outer surface thereof opposite to the first area or part.

In one embodiment, the miniature loudspeaker comprises a second predetermined area or part at least substantially parallel to the first area or part, the second area or part comprising the fixing means and/or the electrically conducting contact means. This facilitates electrical contacting when the miniature loudspeaker is translated or rotated around at a direction perpendicular to the first area, which would normally be the situation.

In order to facilitate the above insertion from the front of the housing, the miniature loudspeaker preferably has an outer contour, in a plane perpendicular to an axis of the miniature loudspeaker through the miniature loudspeaker and the sound outlet thereof, and over a majority of its length from a position farthest from the inlet/outlet and toward the outlet, which outer contour may be circumscribed by a predetermined contour, such as a contour of an opening through which it is to be introduced.

A third aspect of the invention relates to a personal communication device comprising a housing and a miniature loudspeaker, wherein the housing has a first compartment and a sound outlet port toward the surroundings of the housing and wherein the miniature loudspeaker is removably receivable in the first compartment so that the sound outlet port is at least substantially sealed around a predetermined portion of the miniature loudspeaker. In this third aspect, the miniature loudspeaker comprises a sound outlet acoustically coupled to the sound outlet port and the first compartment and the miniature loudspeaker comprise mating first and second electrically conducting contact means adapted to provide solderless/solderfree, electrical conduction between the contact means of the first compartment and the miniature loudspeaker.

Thus, the above-mentioned advantages of the abutting/engaging electrical contact are obtained.

Naturally, the housing may, as in the first aspect, have an inner space having the first compartment and another compartment acoustically separated from the first compartment.

As mentioned above, preferably, the electrically conducting contact means of the first compartment are provided on a surface opposite to the sound outlet port, and the electrically conducting contact means of the miniature loudspeaker are provided on an outer surface thereof substantially opposite to the sound outlet.

Also, as vibrations are normally not desired, the miniature loudspeaker may comprise a pair of diaphragms, the first sides of which are oppositely directed. Then, the housing and miniature loudspeaker may be mechanically coupled/attached to each other without a resilient suspension.

Then, one embodiment comprises a dual-diaphragm miniature loudspeaker for a personal communication device that includes a first and a second electrical biasing/engaging/abutting contact adapted to contact respective corresponding electrical pads placed on a suitable wall portion of the communication device shell. The dual-diaphragm miniature loudspeaker with biasing/abutting/engaging contacts may be based on moving armature or moving coil operating principles. The vibration cancellation effect provided by the present dual-diaphragm miniature loudspeaker allows it to be hard-mounted directly in a communication device (e.g., hearing aid) shell without the resilient suspension and the engaging/abutting/biasing contacts replace the conventional flexible electrical leads to simplify the communication device assembly process.

Also, in order to facilitate assembly and disassembly, the housing and the miniature loudspeaker may comprise mating detachable fixing means adapted to position the miniature loudspeaker in a predetermined position in the first compartment, the mating detachable fixing means being operable by engaging the housing and/or miniature loudspeaker from outside the housing and/or miniature loudspeaker.

Thus, the fixing means could comprise one or more of a snap lock, a thread, a bayonet coupling, a key way, and snap taps.

In addition, at least one of the first and second electrically conducting contact means could be adapted to provide a resilient electrically conducting contact means, where the other then may have any shape, such as a simple fixed surface or element which may protrude from or be depressed into a surface of the housing or miniature loudspeaker. Then, the resilient electrically conducting contact means comprises an electrically conducting spring (e.g., helical, torsion, leaf), or be an electrically conducting foam, web, or the like.

In order to facilitate the tip-mounting, the sound outlet port may have a predetermined inner contour in a predetermined plane, and the miniature loudspeaker may have an outer contour, in a plane perpendicular to an axis of the miniature loudspeaker through the miniature loudspeaker and the sound outlet thereof, and over a majority of its length from a position farthest from the outlet and toward the outlet, which outer contour may be circumscribed by the inner contour of the sound outlet port.

Finally, in order to be able to use at least part of the first chamber for acoustic purposes, the miniature loudspeaker could comprise one or more diaphragms positioned in the miniature loudspeaker for producing the sound, each diaphragm having a first side and a second, opposite side, where an acoustic path exists between the first side(s) and the sound outlet, the miniature loudspeaker further comprising means for providing an acoustic path between the second side(s) of the diaphragm(s) and the at least substantially sealed first compartment of the housing.

As mentioned above, the first compartment may be acoustically connected to any of the front or back chamber of the miniature loudspeaker.

In a fourth aspect, the invention relates to a dual-diaphragm miniature loudspeaker for use in a personal communication device, such as a hearing aid or an in-ear monitor, the miniature loudspeaker comprises a sound outlet positioned in a predetermined area or part of the miniature loudspeaker and a pair of parallelly positioned diaphragms each having a first side and a second, opposite side, an acoustic path between first sides to the sound outlet, and the first sides of the diaphragms or membranes being oppositely positioned. The miniature loudspeaker also comprises one or more electrically conducting contact means positioned on an outer surface of the miniature loudspeaker and adapted to provide solderless/solderfree engagement with mating contact means of a housing of the communication device.

Preferably, the electrically conducting contact means are provided on an outer surface thereof opposite to the first area or part.

Also, it is preferred to have means for releasably fixing the miniature loudspeaker to a housing, the fixing means being operable by engaging the housing and/or the miniature loudspeaker from outside the housing and/or miniature loudspeaker. These fixing means could comprise one or more of a snap lock, a thread, a bayonet coupling, a key way, and snap taps.

Preferably, the electrically conducting contact means are adapted to provide a resilient electrically conducting contact means. These resilient electrically conducting contact means could comprise an electrically conducting spring (e.g. helical, torsion, leaf), or an electrically conducting foam, web, or the like.

Advantageously, the miniature loudspeaker comprises a second predetermined area or part at least substantially parallel to the first area or part, the second area or part comprising the fixing means and/or the electrically conducting contact means.

Also, as is mentioned above, advantages are obtained when the miniature loudspeaker has an outer contour, in a plane perpendicular to an axis of the miniature loudspeaker and through the sound outlet thereof, and over a majority of its length from a position farthest from the outlet and toward the inlet/outlet, which outer contour may be circumscribed by a predetermined contour, such as a contour of an opening through which it is to be introduced.

Finally, the miniature loudspeaker may further comprise means for providing an acoustic path between the second side of the diaphragms and the surroundings of the miniature loudspeaker, the providing means being provided in an area or part being different from the first area or part.

A fifth aspect, the invention relates to a personal communication device, such as an in-ear monitor or a hearing aid, comprising a housing and a miniature transducer, such as a receiver, which may be a moving coil transducer or a moving armature transducer, wherein the housing has a first compartment and a housing opening or sound port toward the surroundings of the housing, the housing opening having a predetermined inner contour in a predetermined plane and wherein the miniature transducer is releasably mounted in the first compartment so that the opening is substantially sealed around a predetermined portion of the miniature transducer. In this aspect, the miniature transducer further comprises a sound outlet positioned in the predetermined area or part and the miniature transducer has an outer contour, in a plane perpendicular to an axis of the miniature transducer and through the sound outlet thereof, and over a majority of its length from a position farthest from the inlet/outlet and toward the inlet/outlet, which may be circumscribed by the inner contour of the opening.

This aspect relates to the tip-mounting where the miniature transducer may be introduced at the opening where the sound is to exit or enter the miniature transducer.

In this embodiment, the miniature transducer may be, for example, a sound producing miniature loudspeaker or a sound detecting receiver.

Also, the housing may comprise the first compartment and a second compartment acoustically sealed there from as described above.

According to this aspect of the present invention, the personal communication device may comprise a hearing aid, such as an ITE/ITC/CIC hearing aid. Naturally, an in-ear monitor may be denoted in the same manner and dimensioned in the same manner. Therefore, these terms may be used interchangeably to denote the same function and/or configuration for both types of apparatuses. Such communication devices may be provided that could comprise a single- or dual-diaphragm receiver or loudspeaker that is replaceable through a front opening located at the tip of the communication device. As will be clear further below, a related aspect is related to a receiver assembly that comprises a lid with a sound outlet port and a wax guard or barrier disposed across the sound outlet port. The receiver assembly and the communication device with the tip replaceable receiver according to aspects of the present invention effectively solve a number of the previously-mentioned problems associated with service and repair replacements of a defective receiver.

Preferably, in accord with at least some aspects, the miniature transducer is a miniature loudspeaker comprising one or more diaphragms positioned in the miniature loudspeaker for producing the sound, each diaphragm having a first side and a second, opposite side, where an acoustic path exists between the first side(s) and the sound outlet. The miniature loudspeaker in accord with this aspect also comprises an acoustic path between the second side(s) of the diaphragm(s) and the at least substantially sealed first compartment of the housing.

Then, the miniature loudspeaker could comprise at least two diaphragms, the first sides of which are oppositely directed. Then, again, the housing and miniature loudspeaker are hard mounted to each other, such as without resilient suspension there between.

In another situation, the housing and the miniature transducer/loudspeaker comprise means for releasably fixing the miniature transducer/loudspeaker in a predetermined position in the first compartment, the fixing means being adapted to be operable by engaging the housing and/or miniature transducer/loudspeaker from outside the housing and/or miniature transducer/loudspeaker. These fixing means could comprise one or more of a snap lock, a thread, a bayonet coupling, a key way, and snap taps.

In yet another embodiment, the first compartment and the miniature transducer/loudspeaker comprise mating first and second electrically conducting contact means adapted to provide solderless/solderfree, electrical conduction between the contact means of the first compartment and the miniature transducer/loudspeaker. Then, at least one of the first and second electrically conducting contact means could be adapted to provide a resilient electrically conducting contact means, such as an electrically conducting spring (e.g. helical, torsion, leaf), foam, or a web, or the like.

The electrically conducting contact means of the first compartment are preferably provided on a surface opposite to the opening, and wherein the electrically conducting contact means of the miniature transducer/loudspeaker are provided on an outer surface thereof opposite to the first area or part.

In addition, in any of the above aspects, the miniature transducer/loudspeaker might further comprise one or more of a mounting ring for providing a sealing between the opening or sound outlet port and the miniature transducer/loudspeaker, the ring having predetermined dimensions, an element adapted to engage the housing at the sound inlet/outlet port or the opening and to bias the miniature transducer/loudspeaker inwardly into the first chamber, and a wax guard sealing provided between the opening or sound outlet port and the surroundings.

The mounting ring may act to keep the miniature transducer/loudspeaker in place and may seal any gaps present between the miniature transducer/loudspeaker and the opening in the housing. This ring may be more easily operable and engageable than the miniature transducer/loudspeaker, whereby it is ensured that the miniature transducer/loudspeaker is not harmed during assembly/disassembly. In addition, the removal of the mounting ring may require destruction of the ring without harming the more expensive and sensitive miniature transducer/loudspeaker.

The biasing could be a biasing against resilient means for providing electrical contact between the miniature transducer/loudspeaker and the first chamber. This biasing also will prevent the miniature transducer/loudspeaker from moving from a predetermined position.

The wax guard may be provided on the outside of the housing at the sound inlet/outlet in order to prevent wax and dirt from entering the housing and miniature transducer/loudspeaker. This wax guard, which may be a membrane, preferably is removable and may be provided on the biasing means or the mounting ring in order to make attachment/assembly and disassembly faster and easier.

In general, in any of the first, third and fifth aspects, the housing could comprise cured photopolymer resin suitable for SLA (Stereo lithography Apparatus) formation of the housing. SLA is a rapid prototyping technology wherein a computer system receives data from a CAD model of the communication device shell contour and cures a liquid photopolymer resin with a laser beam to form a solid three-dimensional object. The rapid prototyping technology makes it cost-effective and straight-forward to build the closed acoustic chamber integrally with the communication device shell at the time of manufacture.

In addition, the housing may be made as a single piece, which may especially be advantageous with the above-mentioned tip-mounting of the miniature transducer/loudspeaker.

Also, in any of the first, third and fifth embodiments, the housing may be a customized ITE/ITC/CIC housing. These housings must have very small dimensions of the parts positioned in the ear canal of the user. The present invention facilitates the providing of very small communication devices.

In addition, in any of the first, third, and fifth aspects, the housing may comprise the first compartment and a second compartment which are separated by a wall part comprising a plurality of through-going electrical conductors. Thus, the miniature transducer/loudspeaker could be positioned in the first compartment and the second compartment could comprise battery, amplifier, other miniature transducer/loudspeakers, etcetera. Then, also, any electrical contacts and any fixing means could be attached to or integral with this wall part separating the two compartments.

Finally, in any of the first, third, or fifth aspects, the housing could have outer dimensions adapted to the dimensions of an ear canal of a specific person and wherein inner dimensions of the first compartment are adapted to the person's hearing problems. This is due to the fact that miniature transducer/loudspeakers may be made so small that excess space is available when no resilient mounting is required of the miniature transducer/loudspeaker in the housing. This space may be used for acoustically adapting the communication device to the particular person and the particular hearing problems of that user.

In still another aspect, the invention relates to a method of mounting a miniature transducer in a housing having a first compartment and an opening or sound inlet/outlet port thereof toward the surroundings of the housing, the method comprising the steps of providing a miniature transducer having a sound inlet or outlet positioned in a predetermined area or part thereof, translating the miniature transducer through the opening and at least partly into the first compartment, providing electrical contact between electrically conducting means of the miniature transducer and electrically conducting means of the first compartment, and fixing the miniature transducer in a releasable manner so that the opening and first compartment are at least substantially sealed and so that sound is able to enter or exit the sound inlet/outlet from or to the surroundings of the housing.

This is the above-mentioned tip-mounting where the miniature transducer is provided in the housing at the position where the sound enters/exits the housing. The advantages of this aspect have been mentioned above.

In one situation, the step of providing the miniature transducer comprises providing a miniature transducer comprising one or more diaphragms positioned in the miniature transducer for producing or receiving the sound, each diaphragm having a first side and a second, opposite side, where an acoustic path exists between the first side(s) and the sound inlet/outlet, and the method further comprising the step of providing an acoustic path between the second side(s) of the diaphragm(s) and the at least substantially sealed first compartment of the housing.

Then, the vibration reduction/damping may be obtained when the miniature transducer comprises at least two diaphragms, the first sides of which are oppositely directed. Then, the fixing step could comprise fixing the housing and the miniature transducer directly to each other, such as without resilient suspension.

Also, the fixing step preferably comprises releasably fixing the miniature transducer in a predetermined position in the first compartment, the fixing step comprising engaging the housing and/or miniature transducer from outside the housing and/or miniature transducer. Then, the method could further comprise the step of detaching the fixed miniature transducer from the housing, the detaching step comprising operating or engaging the housing and/or the miniature transducer from outside the housing and/or the miniature transducer.

The fixing step could comprise using one or more of a snap lock, a thread, a bayonet coupling, a key way, and snap taps.

Preferably, the step of providing electrical contact comprises mating first electrically conducting contact means of the first compartment and second conducting contact means of the miniature transducer so as to provide solderless/solder-free, electrical conduction between the contact means of the first compartment and the miniature transducer. Thus, the mating step preferably comprises having at least one of the first and second electrically conducting contact means provide a resilient electrically conducting contact means. Such resilient electrically conducting contact means could comprise an electrically conducting spring (e.g., a helical, torsion, leaf spring), a foam, a web, or the like.

In one preferred embodiment, the step of providing the housing comprises providing a housing having the first and a second compartment acoustically shielded from each other by a wall part. As mentioned above, the second compartment could be used for housing a battery, an amplifier, and/or other miniature transducers. Then, electrical contacts and fixing means may be attached to or integral with a wall part separating the first and second compartments.

In general, the personal communication device may comprise a hearing aid or an in-ear monitor. An in-ear monitor may comprise a device for a person, or even a trained animal, such as a musician or a security guard, to wear and which is adapted to receive an electrical signal and provide an audible signal into the ear of the person or animal.

Also, in general, the miniature loudspeaker may, for example, be based on a moving coil transducer technology or a moving armature transducer technology.

The above summary of the present invention is not intended to represent each embodiment or every aspect of the present invention. The detailed description and Figures will describe many of the embodiments and aspects of the present invention.

BRIEF DESCRIPTION OF THE DRAWINGS

In the following, the invention will be described with reference to the drawings, wherein:

FIG. 1 illustrates an embodiment of a communication device with a receiver/transducer element therein.

FIG. 2 illustrates a first embodiment of a receiver/transducer element.

FIG. 3 illustrates a second embodiment of a receiver/transducer element.

FIG. 4 illustrates a third embodiment of a receiver/transducer element.

FIG. 5 illustrates a manner of fixing the receiver/transducer element to the housing.

Figure 6:
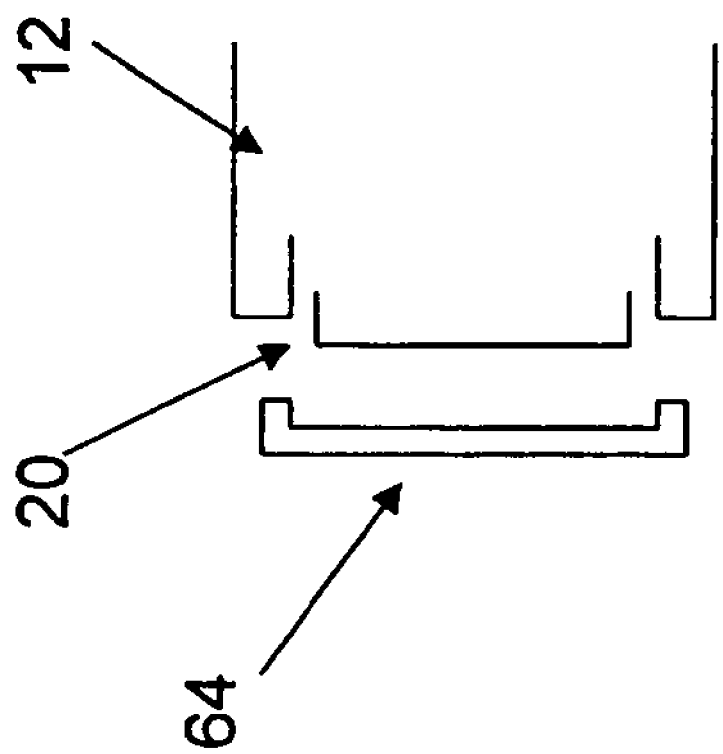
FIG. 6 illustrates the use of an external biasing element.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF THE ILLUSTRATED EMBODIMENTS

In FIG. 1, the overall structure of a preferred embodiment of a personal communication device 10 is seen, having a housing 12 in which is mounted a hearing aid receiver or loudspeaker 20.

The present invention is able to reduce the overall dimensions of the system so that it is useful in CIC, ITE, and ITC hearing aids.

The housing 12 has an inner space that is divided into first and second inner compartments 14 and 15, respectively. The first inner compartment 14 is delimited by the housing walls 17 and an intermediate wall 16 providing an acoustic sealing between the compartments 14 and 15. The transducer element 20 is mounted in the space 14 so as to close or seal an opening 18 in the housing 12.

The transducer element 20 is adapted to receive or generate sound and has a sound inlet/outlet 22 exposed to the surroundings of the hearing aid 10 in the sound inlet/outlet port or opening 18.

The inner structure of the hearing aid receiver or transducer element 20 will be described in further detail further below, primarily as a sound generator even though the present structure is also useful as a sound receiver.

In addition to the sound outlet 22, the receiver/transducer element 20 comprises one or more acoustical apertures or openings 24, the operation of which will be described further below.

The sound generation or reception of the transducer element 20 is controlled or assisted using electronics 30 provided inside the housing 12 and which is electrically connected to the element 20 via electrical conductors 32 contacting solder bumps 34 on the element 20.

One embodiment of the inner structure of the element 20 may be seen in FIG. 2, wherein the element 20 comprises two diaphragms 42 and 44. The diaphragms have a first side pointing away from each other and a second side facing each other. In normal acoustical transducer terminology, the volume or space between the outlet 22 and the diaphragms 42/44 is denoted a front chamber 48, and the space on the other side of (between) the diaphragm(s) 42/44 is denoted the back chamber 50. The two diaphragms 42/44 may have separate back chambers, as it is described in relation to FIGS. 3 and 4, or share a single or common back chamber, as it is illustrated in FIG. 2.

This system may be similar to that described in US2003/0048920, which is commonly owned and herein incorporated by reference in its entirety, and may have the advantage that it is automatically vibration damped compared to single diaphragm systems.

Sound is generated by the diaphragms 42/44 by a driver system illustrated by 46, which drives the diaphragms to generate sound. The driver system may be as that illustrated in the above US application. Other drive systems are well known in the art.

It should be noted that the direction of the sound may also be reversed so that sound is received by entering the inlet 22, exiting the diaphragms 42/44, which then drive the driver system 46 which now generates a voltage/current/frequency or the like and transmits it to the electronics 30, which will process the signal further.

The common back chamber 50 is sealed by the diaphragms 42/44 and walls 52 and 54 which support the diaphragms 42/44 in known manners.

In this embodiment, the front chamber 48, when the element 20 is provided inside the space 14, is acoustically connected to the space 14 via the openings 24. Thus, the acoustic properties of the front chamber 48, and thereby of the hearing aid 10, may be determined by the dimensions also of the openings 24, the number of and positions thereof, as well as the dimensions of the space 14. In addition, the size of the chamber 48 may now be drastically reduced in that the space 14 is now also brought into use.

Another embodiment is illustrated in FIG. 3, wherein the openings 24 are provided into the back chamber 50. Then, this affects the acoustic properties of the back chamber 50, the element 20, and therefore of the hearing aid 10.

In FIG. 3, it is also illustrated that the back chamber 50 may be divided between the diaphragms 42/44 and each of the back chambers 50 may be connected to the space 14 via one or more openings 24.

FIG. 4 illustrates yet another embodiment in which the front chamber 48 now extends between the diaphragms 42/44 which now have their first sides facing toward each other and their second sides facing away from each other.

Again, walls 52/54 separate the front and back chambers 48/50. Also, the hatched line illustrates that the back chamber 50 may be divided in order to provide a separate back chamber for each diaphragm. In this embodiment, the openings 24 connect the back chamber to the space 14. However, the openings may equally well be provided so as to connect the space 14 with the front chamber 48.

In FIG. 4, the solder bumps 34 have been replaced with the springs 32 in order to have these resilient means provided on the element 20.

The mounting of the element 20 in the housing 12 is provided by sliding or translating the element 20 through the opening 18 in such a manner that the element 20, optionally using a sealing element, blocks the opening 18. Preferably, this blocking also facilitates a fixing of the element 20 in the housing 12.

Preferably, the element 20 has a circumferential shoulder 60 either adapted to the inner dimensions of the opening 18 or adapted to engage the opening 18 via a sealing member 62, such as an O-ring or the like.

Alternatively, this shoulder may be adapted to enter a cut-out part 61 (see FIG. 5) of the housing. This provides more surfaces and more space for providing the fixing means desired.

This shoulder may have the means for fixing the element 20 in the space 14. Such means may be snap fixing means, a thread, key way, bayonet socket, or any other manner in which one element may be removably fixed on/with/in another. Preferably, this manner is one with which the element 20 may be brought into engagement with and out of engagement with solely by operating or handling the housing 10 and element 20 from the outside thereof, such as using a translation or a rotation of one element in relation to the other.

The use of a vibration damped element 20 actually facilitates a hard mounting where no vibration damping is provided between the element 20 and the housing 12. This hard mounting may be provided by suitable adhesive agents, such as an epoxy based UV curable adhesive, or by welding.

The shoulder 60 may be dispensed with, as is seen in FIG. 4 illustrating an element 20 without the shoulder 60. The opening 18 or the sealing means 62 would then instead abut or engage the outer surface of the element 20.

Naturally, the fixing means could be provided also at other positions, such as at the sides of the element 20 or at the bottom thereof close to the wall 16.

One alternative is seen in FIG. 6, wherein an external fixing member 62 is provided which is able to be releasably fixed to the housing 12. This fixing member 64 is adapted to engage or abut the transducer/receiver 20 and force it toward the compartment 14, such as against the springs 32, in order to fix the receiver/transducer 20 in a predetermined position (such as defined by a cavity in the fixing member 64) and in order to ensure the electrical connection between the conductors 32 and 34, if these are positioned as illustrated in FIG. 1.

The fixing member 64 may also serve other purposes, such as providing a sealing member, such as a membrane, for preventing dirt, dust, wax, or other foreign matter, from entering the opening 22. The sealing means 62 may also simply provide a grating or guard preventing physical contact from the outside to the receiver/transducer 20.

Naturally, the fixing member 64 may be fixed in any of the above-mentioned manners in order for it to be releasably fixed to the housing 12.

The sealing means 62 may be provided after positioning of the element 20 in the space 14, so that the circumference of the element 20 need not be fully adapted to the inner circumference of the opening 18. Also, in that situation, the circumference of the element 20 need not be the largest at the position closest to the opening 18, when the element 20 is in position in the space 14. Thus, the solder bumps 34 may be positioned on the side of the element 20 as illustrated in FIGS. 2 and 3, even if no shoulder 60 is present.

However, it is preferred that the largest outer contour circumscribing the outer surface of the transducer element, when projected onto a plane perpendicular to the direction of introduction, such as shown by the fat arrow in FIG. 1, is positioned at the position also abutting/engaging the opening 18 or the sealing means 62. In that manner, it is ensured that the element 20 is introducible through the opening 18 and that a sufficient sealing is obtainable.

The solder bumps 34 and the conductors 32 provide an electrical connection using only abutment and no adhesion/welding/soldering/gluing or the like. In that manner, connection is automatically obtained when the element 20 is in the correct position and no additional steps are required.

Different positions are possible for the solder bumps 34 and the conductors 32. In FIGS. 1 and 4, these elements are provided at the bottom of the space 14 at the opposite end of the element 20 than the opening 22. In that manner, the element 20 may be biased toward the conductors 32, which may themselves provide a spring action by, for example, forming a torsion spring, leaf spring, a resilient material, or the like. This biasing may be provided by the hard mounting or vibration damping mounting or by other means.

Other positions may be at sides of the element 20, but the biasing effect may be the same.

Naturally, other manners of providing the pressure contacts or abutting contacts may be used, such as electrically conducting areas of the surface of the element 20 replacing solder bumps. The resilient parts may be provided on the element 20 instead in the housing 12.

Figure 7:
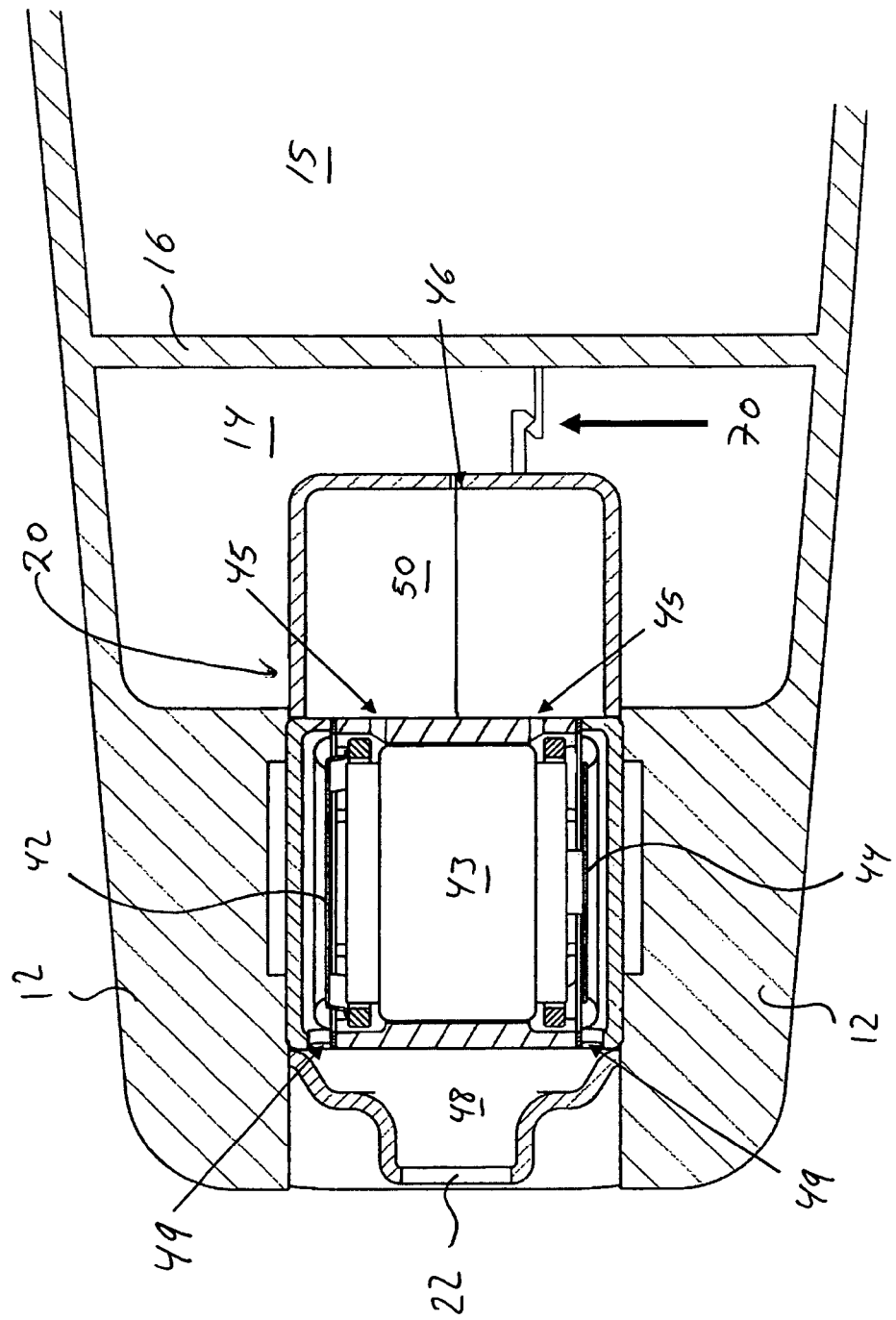
FIG. 7 illustrates another embodiment using a particular type of transducer.

FIG. 7 illustrates another embodiment in which a transducer 20 is positioned in a housing 12 to form an assembly for a hearing aid 10.

The transducer 20 comprises two oppositely positioned membranes 42 and 44 driven by a driver 43 or which feed a detecting means 43 detecting movements of the membranes 42/44.

Side facing openings 49 are provided between the first (outer) sides of the membranes 42/44, where also small front chambers are defined, and a common, or second, front chamber 48 of the transducer. The sound inlet/output 22 of the transducer 20 being directly connected to the common front chamber 48.

Naturally, the sound from the diaphragms 42/44 may also be transported via openings radially, such as shown in FIG. 7, if suitable openings or sound ports are provided in the housing 12. Alternatively, the transducer 20 may extend slightly out of the housing 12 in order for the sound to exit in that direction.

The transducer 20 has, in addition to the back chambers defined on the "inner" sides of the diaphragms 42/44, a built-in common back chamber 50, which is connected to the second sides (facing each other and the means 43) of the membranes 42/44 via openings 45.

The housing 12 comprises, as does that of FIG. 1, a first chamber 14 in which the transducer is positioned, and a second chamber 15, separated from the chamber 14 by a wall 16. As mentioned, electronics 30 including, but not limited to, an amplifier or the like, batteries, and/or other electronics, for example, may be positioned in the second chamber 15 in order to have as large a volume as possible in the first chamber 14.

In the present embodiment, the transducer 20 is fixed inside the housing 12 by two interlocking hooks 70, one of which is fixed to the wall 16 and one of which is fixed to the transducer 20. Introducing the transducer 20 through the opening in the housing 12 will make the hooks 70 engage and thereby fix the transducer 20 in the housing 12.

Naturally, other fixing means may be used, and in general, it may be preferred that the fixing means are detachable in order to easily have these disengage in order to be able to remove the transducer 20 from the housing 12.

In addition or alternatively, the hooks 70 may be used for providing electrical connection to the driving means 43, preferably comprising two coils in the present transducer 20. Alternatively, connection means as described in the other drawings may be used in order to obtain a solder-less or solder-free, electrical connection to the driving means or detecting means of the transducer.

It should be noted that the set-up of FIG. 7 may be used equally well in all types of communication systems having a part for introduction into the ear of a person. It is not important from where the signal for a driver (to generate sound) or to where a signal (if sound is detected, is transmitted. Thus, this set-up is useful in both hearing aids, where the signal stems from a microphone) as well as in ear monitors, where the signal may be transmitted over a wireless connection from a remote source.

In various other aspects, the present concepts include a hearing aid comprising a housing and a receiver, the housing comprising an inner space having a first compartment and a second compartment acoustically sealed from the first compartment, the first compartment comprising a sound outlet port toward the surroundings of the housing. In this aspect, the receiver is releasably mounted in the first compartment so that the sound outlet port is substantially sealed around a predetermined portion of the receiver. In this aspect, the receiver comprises a sound outlet acoustically coupled to the sound outlet port of the first compartment, a diaphragm positioned in the receiver for producing the sound, the diaphragm comprising first and second opposing surfaces, a first acoustic path between the first surface and the sound outlet, and a second acoustic path between the second surface of the diaphragm and the first compartment of the housing. In various other aspects, the above-noted receiver may comprises a pair of diaphragms, the first sides of which are oppositely directed. The housing and receiver may optionally be hard-mounted to each other. The housing and the receiver may also comprise attachment devices for releasably attaching the receiver in a predetermined position in the first compartment. These attachment devices (e.g., a snap lock, a thread, a bayonet coupling, a key way, and/or snap taps) are preferably adapted to be operable by engaging the housing and/or receiver from outside the housing and/or receiver.

In accord with such hearing aid, the first compartment and the receiver may comprise mating electrically conducting members adapted to provide a solderless/solderfree, electrical connection therebetween. In at least some aspects, at least one of the electrically conducting members is resilient (e.g., an electrically conducting spring). The electrically conducting member of the first compartment may be provided on a surface opposite to the sound outlet port and the electrically conducting member of the receiver may be provided on an outer surface thereof opposite to the first area or part. In accord with any of the preceding aspects of such hearing aid, the sound outlet port may have a predetermined inner contour in a predetermined plane, and the receiver has an outer contour, in a plane perpendicular to an axis of the receiver through the receiver and the sound outlet thereof, and over a majority of its length from a position farthest from the inlet/outlet and toward the outlet, which outer contour may be circumscribed by the inner contour of the sound outlet port.

In still other aspects of the present concepts, a receiver is provided comprising a sound outlet positioned in a first predetermined portion and being adapted to transport sound from an inner chamber of the receiver and through the sound outlet and toward the surroundings of the receiver, and one or more diaphragms positioned in the receiver for producing the sound, each diaphragm having a first side and a second, opposite side, an acoustic path existing between the first side(s) and the sound outlet. The receiver also comprises an acoustic path between the second side(s) of the diaphragm(s) and the surroundings of the receiver, the acoustic path being provided in a second portion different from the first predetermined portion and means for releasably fixing the receiver to a housing, the fixing means being operable by engaging the housing and/or the receiver from outside the housing and/or receiver.

The receiver noted in the preceding paragraph may comprise at least two diaphragms, the first sides of which are oppositely directed. The noted fixing means may comprise one or more of a snap lock, a thread, a bayonet coupling, a key way, and snap taps. The receiver may also advantageously comprise electrically conducting contact means adapted to provide solderless/solderfree, electrical conduction between the contact means of a first compartment of a housing. In at least some aspects, the electrically conducting contact means are adapted to provide a resilient electrically conducting contact means (e.g., an electrically conducting spring). Such electrically conducting contact means may be provided on an outer surface of the receiver opposite to the first area or part. The receiver may comprise a second predetermined area or part at least substantially parallel to the first area or part, the second area or part comprising the fixing means and/or the electrically conducting contact means. The receiver may also have an outer contour, in a plane perpendicular to an axis of the receiver through the receiver and the sound outlet thereof, and over a majority of its length from a position farthest from the inlet/outlet and toward the outlet, which outer contour may be circumscribed by the a predetermined contour.

In still other aspects of the present concepts, a hearing aid comprising a housing and a receiver is provided wherein the housing has a first compartment and a sound outlet port toward the surroundings of the housing, the receiver is removably receivable in the first compartment so that the sound outlet port is at least substantially sealed around a predetermined portion of the receiver, the receiver comprises a sound outlet acoustically coupled to the sound outlet port, and the first compartment and the receiver comprise mating first and second electrically conducting contact means adapted to provide solderless/solderfree, electrical conduction between the contact means of the first compartment and the receiver.

In yet another aspect of the present concepts, a dual-diaphragm hearing aid receiver is provided comprising a sound outlet positioned in a predetermined area or part of the receiver, a pair of parallelly positioned diaphragms each having a first side and a second, opposite side, an acoustic path between first sides to the sound outlet, and the first sides of the diaphragms or membranes being oppositely positioned, and one or more electrically conducting contact means positioned on an outer surface of the receiver and adapted to provide solderless/solderfree engagement with mating contact means of a housing of the hearing aid.

In still another aspect of the present concepts, a hearing aid is provided comprising a housing and a receiver, wherein the housing has an first compartment and a housing opening or sound port toward the surroundings of the housing, the housing opening having a predetermined inner contour in a predetermined plane, the receiver is releasably mounted in the first compartment so that the opening is substantially sealed around a predetermined portion of the receiver, the receiver comprises a sound outlet positioned in the predetermined area or part, and the receiver having an outer contour, in a plane perpendicular to an axis of the receiver and through the sound outlet thereof, and over a majority of its length from a position farthest from the inlet/outlet and toward the inlet/outlet, which outer contour may be circumscribed by the inner contour of the opening. The receiver may optionally comprise one or more diaphragms positioned in the receiver for producing the sound, each diaphragm having a first side and a second, opposite side, where an acoustic path exists between the first side(s) and the sound outlet, and/or means for providing an acoustic path between the second side(s) of the diaphragm(s) and the at least substantially sealed first compartment of the housing.

In any of the above aspects of the present concepts, the housing of the personal communication device (e.g., hearing aid or in-ear monitor) may comprise a cured photopolymer resin. Such resins are suitable for SLA formation of the housing.

In any of the above aspects of the present concepts, the housing of the personal communication device may comprise a first compartment and a second compartment, the first compartment being at least partially, if not fully, separated from the second compartment by a wall, partition, and/or membrane comprising a plurality of vias bearing electrically conductive material.

In any of the above aspects of the present concepts, the housing of the personal communication device has outer dimensions adapted to the dimensions of an ear canal of a specific person and wherein inner dimensions of the first compartment are adapted to the person's hearing problems.

Any of the above aspects of the present concepts may comprise a receiver miniature transducer further comprising one or more of a mounting ring for providing a sealing between the opening or sound outlet port and the receiver, the ring having predetermined dimensions, an element adapted to engage the housing at the sound inlet/outlet port or the opening and to bias the receiver inwardly into the first chamber, and a wax guard sealing provided between the opening or sound outlet port and the surroundings.

In accord with other aspects of the present concepts, a method of mounting a receiver in a housing of a personal communication device having a first compartment and an opening or sound inlet/outlet port thereof toward the surroundings of the housing is provided. One such method comprises the steps of providing a receiver having a sound inlet or outlet positioned in a predetermined area or part thereof, translating the receiver through the opening and at least partly into the first compartment, providing electrical contact between electrically conducting means of the receiver and electrically conducting means of the first compartment, and fixing the receiver in a releasable manner so that the opening and first compartment are at least substantially sealed and so that sound is able to enter or exit the sound inlet/outlet from or to the surroundings of the housing.

In accord with the aforementioned method, the step of providing the receiver may comprise providing a receiver comprising one or more diaphragms positioned in the receiver for producing or receiving the sound, each diaphragm having a first side and a second, opposite side, where an acoustic path exists between the first side(s) and the sound inlet/outlet. The method may also include the step of providing an acoustic path between the second side(s) of the diaphragm(s) and the at least substantially sealed first compartment of the housing. The fixing step may comprise, for example, fixing the housing and the receiver directly to each other and/or releasably fixing the receiver in a predetermined position in the first compartment, the fixing step comprising engaging the housing and/or receiver from outside the housing and/or receiver, such as by utilizing one or more of a snap lock, a thread, a bayonet coupling, a key way, and snap taps.

The method may further comprise the step of detaching the fixed receiver from the housing, the detaching step comprising operating or engaging the housing and/or the receiver from outside the housing and/or the receiver.

The step of providing electrical contact may comprise mating first electrically conducting contact means of the first compartment and second conducting contact means of the receiver so as to provide solderless/solderfree, electrical conduction between the contact means of the first compartment and the receiver. The mating step may comprise providing a resilient electrically conducting contact means, such as an electrically conducting spring.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A hearing aid or ear monitor comprising a housing and a miniature loudspeaker, wherein:
    the housing has a first compartment and a sound outlet port toward the surroundings of the housing,
    the miniature loudspeaker is removably receivable in the first compartment so that the sound outlet port is at least substantially sealed around a predetermined portion of the miniature loudspeaker,
    the miniature loudspeaker comprises a sound outlet acoustically coupled to the sound outlet port, and
    the first compartment and the miniature loudspeaker comprise mating first and second electrically conducting contact means adapted to provide solderless/solderfree, electrical conduction between the contact means of the first compartment and the miniature loudspeaker,
    wherein the sound outlet port has a predetermined inner contour in a predetermined plane, and the miniature loudspeaker has an outer contour, in a plane perpendicular to an axis of the miniature loudspeaker through the miniature loudspeaker and the sound outlet thereof, and over a majority of its length from a position farthest from the outlet and toward the outlet, which outer contour may be circumscribed by the inner contour of the sound outlet port, and
    wherein the miniature loudspeaker comprises a pair of diaphragms, the first sides of which are oppositely directed.

2. A hearing aid or ear monitor comprising a housing and a miniature loudspeaker, wherein:
    the housing has a first compartment and a sound outlet port toward the surroundings of the housing,
    the miniature loudspeaker is removably receivable in the first compartment so that the sound outlet port is at least substantially sealed around a predetermined portion of the miniature loudspeaker,
    the miniature loudspeaker comprises a sound outlet acoustically coupled to the sound outlet port, and
    the first compartment and the miniature loudspeaker comprise mating first and second electrically conducting contact means adapted to provide solderless/solderfree, electrical conduction between the contact means of the first compartment and the miniature loudspeaker,
    wherein the sound outlet port has a predetermined inner contour in a predetermined plane, and the miniature loudspeaker has an outer contour, in a plane perpendicular to an axis of the miniature loudspeaker through the miniature loudspeaker and the sound outlet thereof, and over a majority of its length from a position farthest from the outlet and toward the outlet, which outer contour may be circumscribed by the inner contour of the sound outlet port, and
    wherein the housing and the miniature loudspeaker comprise mating detachable fixing means adapted to position the miniature loudspeaker in a predetermined position in the first compartment, the mating detachable fixing means being operable by engaging the housing and/or miniature loudspeaker from outside the housing and/or miniature loudspeaker.

3. A hearing aid or ear monitor according to claim 1, wherein the housing and miniature loudspeaker are mechanically coupled without a resilient suspension.

4. A hearing aid or ear monitor according to claim 2, wherein the electrically conducting contact means of the first compartment are provided on a surface opposite to the sound outlet port, and wherein the electrically conducting contact means of the miniature loudspeaker are provided on an outer surface thereof substantially opposite to the sound outlet.

5. A hearing aid or ear monitor according to claim 2, wherein the fixing means comprise one or more of a snap lock, a thread, a bayonet coupling, a key way, and snap taps.

6. A hearing aid or ear monitor according to claim 2, wherein at least one of the first and second electrically conducting contact means are adapted to provide a resilient electrically conducting contact means.

7. A hearing aid or ear monitor according to claim 6, wherein the resilient electrically conducting contact means comprises an electrically conducting spring.

8. A hearing aid or ear monitor according to claim 2, wherein the miniature loudspeaker comprises one or more diaphragms positioned in the miniature loudspeaker for producing the sound, each diaphragm having a first side and a second, opposite side, where an acoustic path/opening/tunnel/channel exists between the first side(s) and the sound outlet, the miniature loudspeaker further comprising an acoustic path/opening/tunnel/channel between the second side(s) of the diaphragm(s) and the at least substantially sealed first compartment of the housing.

9. A hearing aid or ear monitor according to claim 2, which is a hearing aid or an in ear monitor.

10. A hearing aid or ear monitor according to claim 2, wherein the miniature loudspeaker is a moving coil transducer or a moving armature transducer.

11. A hearing aid or ear monitor according to claim 9, the miniature loudspeaker further comprising one or more of:
 a mounting ring for providing a sealing between the opening or sound outlet port and the miniature loudspeaker, the ring having predetermined dimensions,
 an element adapted to engage the housing at the sound inlet/outlet port or the opening and to bias the miniature loudspeaker inwardly into the first chamber, and
 a wax guard sealing provided between the opening or sound outlet port and the surroundings.

* * * * *